Feb. 3, 1970      R. C. JOHNSTON      3,493,072
MARINE SEISMIC EXPLORATION ENERGY SOURCE
Filed Dec. 29, 1967      2 Sheets-Sheet 1
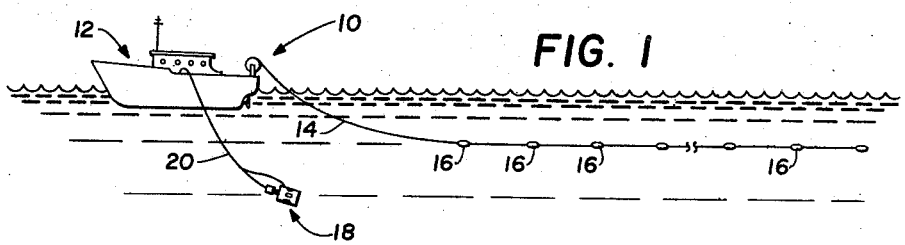
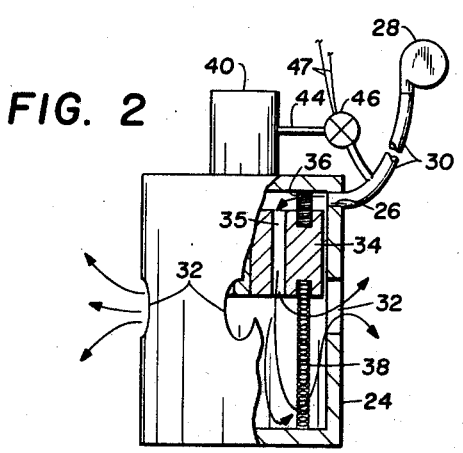
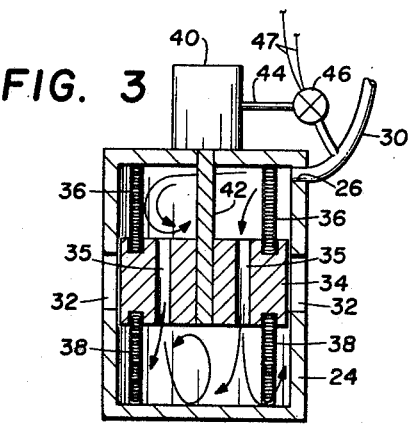
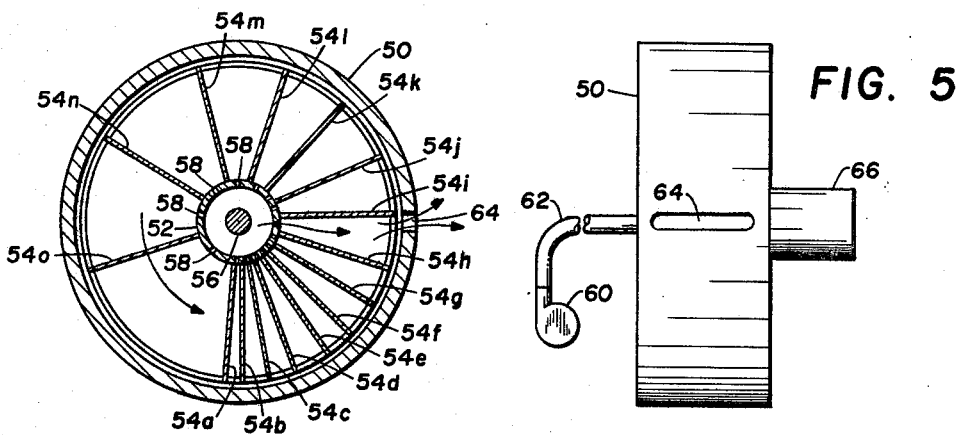
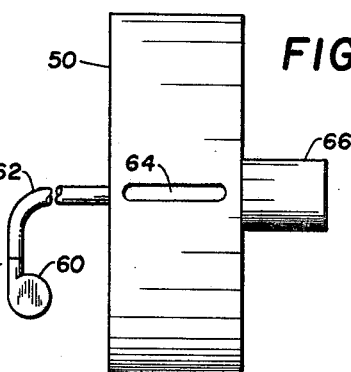
INVENTOR
ROY C. JOHNSTON
ATTORNEY

INVENTOR
ROY C. JOHNSTON

ATTORNEY

United States Patent Office 3,493,072
Patented Feb. 3, 1970

3,493,072
MARINE SEISMIC EXPLORATION
ENERGY SOURCE
Roy Charles Johnston, Richardson, Tex., assignor to Texas Instruments Incorporated, Dallas, Tex., a corporation of Delaware
Filed Dec. 29, 1967, Ser. No. 694,489
Int. Cl. G10k 10/00
U.S. Cl. 181—.5                  14 Claims

ABSTRACT OF THE DISCLOSURE

Seismic energy for marine operations is generated by releasing pressurized gas from an underwater chamber in successively varying quantities to create air bubbles having varying fundamental frequencies. The chamber includes movable valve structure to control the quantity and the rate at which the pressurized gas is released.

---

This invention relates to sources of acoustic energy for underwater exploration, and more particularly to acoustic energy sources wherein pressurized gas is released underwater.

It is the practice in marine seismic exploration to tow a plurality of seismic wave detectors behind a vessel and to periodically activate from the vessel a source of seismic impulses. One type of seismic impulse generators has heretofore been developed wherein fixed volumes of pressurized gas are released underwater to create seismic waves. An example of such a system is described and disclosed in U.S. Patent 3,322,332, issued May 30, 1967. While such generators are generally acceptable for a number of exploration applications, many sophisticated seismic exploration systems often require the generation of seismic energy with varied frequencies in order to produce effective seismic events.

Variable frequency acoustic sources have thus heretofore been developed which comprise a relatively large piston or diaphragm driven by a diesel engine or a hydraulic cylinder. In order to vary the output frequency of such mechanical acoustic sources, the throttle of the diesel engine, or alternatively the servo valves for the hydraulic cylinder, are required to be time controlled. Such mechanical acoustic sources have not only been found to be relatively cumbersome, but have often not been found to be completely satisfactory with respect to low frequency signal strength.

Acoustic generators are also known which release bubbles underwater from a number of chambers having different volumes in order to provide wavelets having predetermined energy spectrums. A disclosure of such a system may be found in the copending application Ser. No. 601,092, filed Dec. 10, 1966, now Patent No. 3,437,170. However, such a generator is not selectively operable to provide seismic energy with a continuously varied fundamental frequency.

In accordance with the present invention, pressurized gas is supplied to an underwater chamber and successively varying quantities of the gas are released through an output port of the chamber into the surrounding water or hydraulic fluid medium such as mud, thereby to create pressurized gas bubbles for generation of acoustic signals having varying fundamental frequencies. The rate at which the varying quantities of pressurized gas is released from the underwater chamber may be varied in order to selectively produce a periodic or nonlinear emission of varying acoustic energy frequencies.

In one aspect of the invention, a vented piston is reciprocated inside an underwater chamber in order to selectively vary the size of the outlet apertures through which pressurized air is released into the hydraulic fluid medium and the length of time the outlet apertures are open. In another aspect of the invention, a plurality of radial vanes having graduated spacings are rotated past an output port in an underwater chamber in order to selectively vary the volume of pressurized gas released through the port into the surrounding water or fluid medium.

For a more complete understanding of the present invention and for further objects and advantages thereof, reference may now be had to the following description taken in conjunction with the accompanying drawings in which:

FIGURE 1 is a diagrammatic view of a marine seismic exploration system utilizing the present acoustic source;

FIGURE 2 is a somewhat diagrammatic view, partially broken away, of one embodiment of the present acoustic source;

FIGURE 3 is a sectional view of the source shown in FIGURE 2 in a different operating position;

FIGURE 4 is a top sectional view of a preferred embodiment of the present source;

FIGURE 5 is a side view of the source shown in FIGURE 4;

Figure 6:
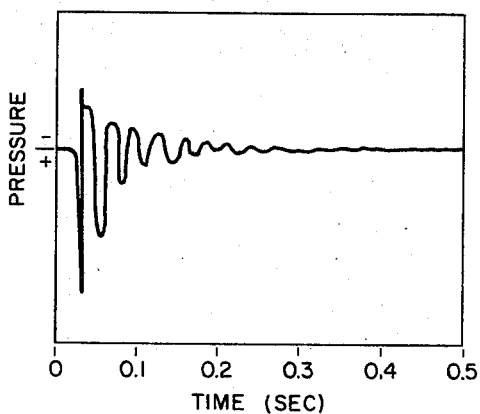
FIGURE 6 is a graphical representation of the pressure wave resulting from a bubble released underwater as a function of time.

Referring to the drawings, FIGURE 1 illustrates a typical marine seismic exploration system designated generally by the numeral 10 and comprising a vessel 12 which tows a cable 14 containing a plurality of seismic wave detectors 16. The vessel 12 also tows an acoustic signal source 18 constructed in accordance with the invention by a suitable cable 20 through water or other liquid fluid such as mud. A source of pressurized gas, not shown, is contained onboard vessel 12 and supplied through cable 20 to the source 18. The source 18 may be selectively actuated from the vessel 12 to release predetermined quantities of the pressurized gas to form gas bubbles. Wavelets having predetermined energy spectrums are thus produced which are reflected from the subsurface and received by the detectors 16 to provide indications of the characteristics of the subsurface. In accordance with the present invention, the frequency of the wavelets generated by the acoustic source 18 is varied in order to provide more meaningful seismic records.

FIGURES 2 and 3 illustrate one embodiment of the acoustic source 18. A cylindrical chamber 24 includes an inlet 26 through which pressurized gas is introduced from a suitable source 28. Source 28 is normally located aboard the exploration vessel 12 and feeds gas to the underwater chamber 24 via a flexible conduit 30. A plurality of outlet ports 32 are provided about the periphery of the chamber 24. While in the illustrated embodiment the outlet ports 32 are illustrated with an oval configuration, it will be undestood that the outlet ports could have other shapes depending upon the intended use of the source.

A cylindrical piston member 34 is disposed within the chamber 24 and is dimensioned so that it may be reciprocated with in the chamber. Venting ports 35 are defined through the piston 34 in order to equalize the pressure between the top and the bottom of the underwater chamber 24. It will be understood, that if desired, the venting ports 35 could be eliminated and a second gas inlet added to the bottom of the gas chamber 24. When not being driven, the piston 34 is normally centrally maintained within the chamber 24 (as shown in FIGURE 3) by a piston rod 42 and by opposing forces exerted by springs 36 and 38 disposed on opposite sides of the piston 34.

A power source 40 is attached to one end of the cylindrical chamber 24 to drive the piston 34 within the chamber 24. The piston rod 42 connects the power source 40 with the piston 34. The power source 40 comprises, for instance, an air motor which is energized by pressurized air bled from the conduit 30 through a small air hose 44. The air motor rotates a crank (not shown) in order to raise and lower the rod 42. A solenoid-controlled valve 46 is disposed in the hose 44 and is selectively operated by signals from the vessel 12 applied through electrical lines 47 in order to allow control of the rate at which the power source 40 reciprocates the piston 34. Alternatively, the power source 40 may comprise a suitable electrical motor which is selectively energized from a power source carried abroad the vessel 12.

In operation of the acoustic signal source shown in FIGURES 2 and 3, pressurized gas is introduced through the inlet port 26 into the chamber 24 simultaneously with the energization of the power source 40. The piston 34 is then driven from the central position shown in FIGURE 3 to the upper position in chamber 24 shown in FIGURE 2. The stroke of the rod 42 and the springs 36 prevent the piston 34 from sealing against the top of the chamber 24. Pressurized gas passes through the inlet port 26, through the venting ports 35 and out the outlet ports 32 to form gas bubbles. The diameters, or volume, of the gas bubbles are determined by the effective cross sectional area of the outlet ports 32, the pressure, volume and temperature existing in the chamber prior to uncovering the outlet ports, and the length of time the outlet ports are open. After a predetermined time, the piston 34 is moved back to the position shown in FIGURE 3, wherein the outlet ports 32 are blocked and no gas is released from the chamber 24. The piston 34 is then reciprocated downwardly to a position at the bottom of chamber 24, and gas bubbles are formed having diameters again determined by the effective cross sectional area of the outlet ports 32, the pressure, volume and temperature existing in the chamber prior to uncovering the outlet ports, and the length of time the outlet ports are open. After a predetermined time interval, the piston is again moved to the position shown in FIGURE 3.

It is desirable for the reasons previously discussed that the volume of the gas bubbles released from the device shown in FIGURES 2 and 3 be selectively variable. This may be accomplished by varying the rate and manner of reciprocation of piston 34 within the chamber 24, or by varying the pressure of the gas supplied to the chamber 24. A brief explanation of the principles involved in the formation of gas bubbles from chamber 24 will serve to better illustrate how the volume of the bubbles may be varied.

Assuming isentropic flow of pressurized gas through an aperture in an essentially constant volume chamber, it can be shown that:

$$G_0 = P_0 r^{\frac{1}{\gamma}} \sqrt{\frac{2g}{RT_0}\left(\frac{\gamma}{\gamma-1}\right)} \sqrt{1 - r^{\frac{\gamma-1}{\gamma}}} \quad (1)$$

wherein,
$G_0$=initial mass flow rate (lb.$_m$/sec.)
$P_0$=chamber initial pressure (p.s.i.a.)
$T_0$=initial gas temperature (°R.)
$R$=gas constant for air $$\left(\frac{53.3 \text{ ft.} - \text{lb.}_f}{\text{lb.}_m - °R.}\right)$$

$g$=32.2 ft./sec.$^2$
$\gamma$=ratio of specific heats (1.4)

$r$=ratio of pressure of chamber aperture to atmospheric pressure for critical or "choked" conditions (0.53).

Reducing Equation 1:

$$\frac{G_0\sqrt{T_0}}{P_0} = 0.532 \frac{\text{lb.}_m - °R.^{1/2}}{\text{lb.}_f - \text{sec.}} \quad (2)$$

Under the assumption of Equation 2 that $G\sqrt{T}/P$ is a constant, it can be shown that the pressure of the chamber varies according to the following relationship:

$$P = P_0\left[1 - \frac{CART_0^{1/2}(1-\gamma)t}{2V_0}\right]^{\frac{2\gamma}{\gamma-1}} \quad (3)$$

where, $$C = \frac{G\sqrt{T}}{P} = 0.532 \frac{\text{lb.}_m - °R.^{1/2}}{\text{lb.}_f - \text{sec.}}$$

$A$=exit aperture area (in.$^2$)
$R$=53.3 ft.-lb.$_f$/lb.$_m$ - ° R.
$P_0$=initial chamber pressure (p.s.i.a.)
$T_0$=initial gas temperature (°R.)
$\gamma$=ratio of specific heats (1.4)
$V_0$=chamber volume (in.$^3$)
$t$=time exit aperture in open (sec.)

For example, under the following conditions,
$V_0$=20 in.$^3$
$A$=1 in.$^2$
$P_0$=2015 p.s.i.a.
$T_0$=520° R., Equation 3 provides:

$$P = 2015(1 + 77.5t)^{-7} \quad (4)$$

It may also be shown that the mass flow rate is represented by:

$$G = C \frac{P_0^{\frac{\gamma-1}{2\gamma}} P^{\frac{\gamma+1}{2\gamma}}}{\sqrt{T_0}} \quad (5)$$

Substituting from the foregoing example, $$G = \frac{47}{(1+77.5t)^6} \frac{\text{lb.}_m}{\text{sec.}} \quad (6)$$

The mass of the released gas is the integrated mass flow rate of the gas. Hence, $$M_{out} = \int_0^t \frac{47A}{(1+77.5t)^6} dt \quad (7)$$

From the foregoing, it will be understood that the mass, and hence the volume, of pressurized gas released from a chamber through an exit aperture is dependent upon the time the exit aperture is open. Additionally, the volume of gas released from the chamber is dependent upon the pressure and temperature within the chamber, the volume of the chamber, and the area of the exit aperture.

It will thus be apparent that when the pressure of the gas supplied to chamber 24 is varied or when the rate of reciprocation of the piston 34 within the chamber 24 is varied to change the time that the outlet ports 32 are open, gas bubbles of varying sizes will be created. As will be more fully described, the fundamental frequency of the energy produced by the emission of the gas bubbles will be dependent upon the size of the bubbles. The present device thus enables the generation of acoustic signals having varying fundamental frequencies.

FIGURES 4 and 5 illustrate a preferred embodiment of the present acoustic signal source wherein the volume of the gas chamber is varied. The source comprises a cylindrical casing 50 which encompasses a vaned rotor 52. Rotor 52 includes a plurality of radial vanes 54a–54o which are rotated about the rotor axis 56. Fifteen ports 58 are defined about the rotor 52 to allow pressurized gas supplied by a suitable source 60 through a conduit 62 to pass from the top of the casing 50 to the space defined between each of the vanes 54a–54o. The ports 58 are restricted in area, or check valves could be disposed in each of the ports 58, in order that gas flows through the ports 58 in only one direction. As may be seen by inspection of FIGURE 4, the spacing between the vanes 54a–54o is graduated from a relatively small spacing between the vanes 54a–54b to a relatively large spacing between vanes 54o and 54a. A single elongated outlet port 64 is defined through the casing 50. The rotor 52 and the vanes 54a–54o are rotated by a suitable power source 66 so that each of the vanes passes the outlet 64 during a revolution of the rotor 52.

Power source 66 comprises an air motor which is operated by a portion of the air supplied by the conduit 62 in the manner previously described. The operation of the power source 66 may be controlled by a suitable solenoid-controlled valve (not shown) which is actuated from aboard the towing vessel. Alternatively, the power source 66 may comprise an electrical motor which rotates the rotor 52. By suitable electrical connections with the towing vessel, the speed and actuation of the power source 66 may thus be controlled.

In operation of the device shown in FIGURES 4 and 5, pressurized gas is supplied through the conduit 62 to the casing 50. The pressurized gas passes to the interior of rotor 52 and out one of the ports 58 to the chamber formed by the pair of vanes presently straddling the outlet port 64. Due to the graduated spacing between the vanes 54a–54o, the quantity of pressurized gas released through the outlet port 64 is dependent upon the position of the rotor 52 with respect to the outlet port 64. When the rotor 52 is rotated in a counterclockwise manner, the volume of the individual chambers and hence the quantity of gas released through the outlet port 64 is changed in graduated intervals. The fundamental frequencies of the resulting gas bubbles is thus varied. By controlling the speed of rotation of the rotor 52, it will be understood that the rate at which the increasing amounts of pressurized gas are released may also be controlled. The number of radial vanes may be increased or decreased to provide other desired gas bubble frequency spectrums.

Although the vane members 54a–54o are illustrated as being rectilinear, it will be understood that the vanes could be slightly curved in order that the gas passing from the center of the casing 50 through the outlet port 64 rotates the vanes without the necessity of the power source 66.

FIGURES 6–9 are of assistance in understanding how the fundamental frequency of the wave generated by a gas bubble is dependent upon the volume of the bubble. FIGURE 6 illustrates the pressure wave as a function of time taken three feet from a gas bubble which is created by releasing a quantity of pressurized gas. This pressure wave may be seen to take the form of a damped sinusoidal wavetrain with approximately constant oscillation frequency. Analysis of the power spectrum of such a pressure wave indicates that approximately 50% of the acoustic energy radiated by the oscillation air bubble pressure wave resides in a relatively narrow frequency band centered around a fundamental frequency. This fundamental frequency of bubble oscillation has been found to conform very closely to the relation:

$$f_0 = 57.6 \frac{P_0^{5/6}}{(P_c V_c)^{1/3}} \qquad (8)$$

wherein, $f_0$ = the fundamental frequency in cycles per second,
$P_0$ = local hydrostatic pressure (p.s.i.a.),
$P_c$ = gas chamber pressure (p.s.i.a.), and
$V_c$ = gas chamber volume in cubic inches.

This equation has been verified over the following range of variables:

$7 < P_0 < 60$ ft. of water,
$500 < P_c < 2000$ p.s.i.a., and
$10 < V_c < 600$ cubic inches.

Figure 7:
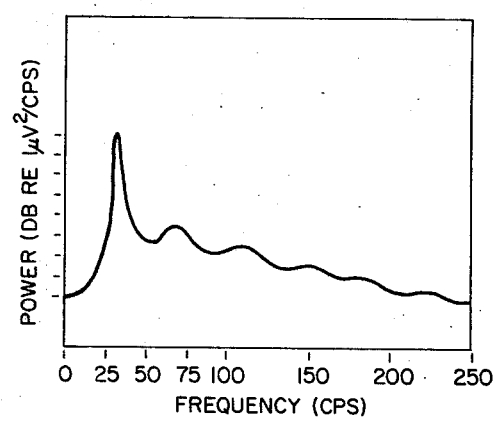
FIGURE 7 is a graph illustrating the power spectrum of a gas bubble released underwater according to the invention.

An exemplary power spectrum produced by such a pressure wave is illustrated in FIGURE 7. It will be noted that, under the particular boundary and initial conditions present, peak power is developed primarily in a narrow frequency band of 30 to 40 cycles per second. About one-half of the acoustic energy of the pressure wave is concentrated in a band of about 5 cycles per second centered about the peak in the power spectrum, or the fundamental frequency of bubble oscillation, which is about 35 cycles per second for the present example.

Figure 8:
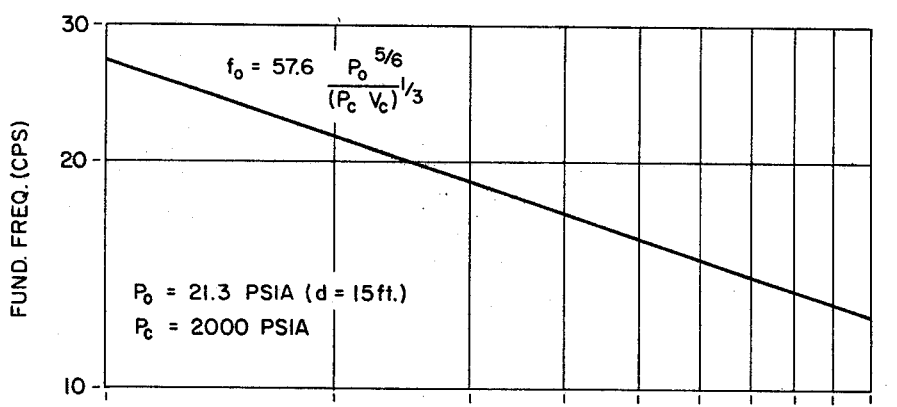
FIGURE 8 is a graphical representation of the fundamental frequency of underwater gas bubbles as a function of the volume of the underwater gas chambers.
Figure 9:
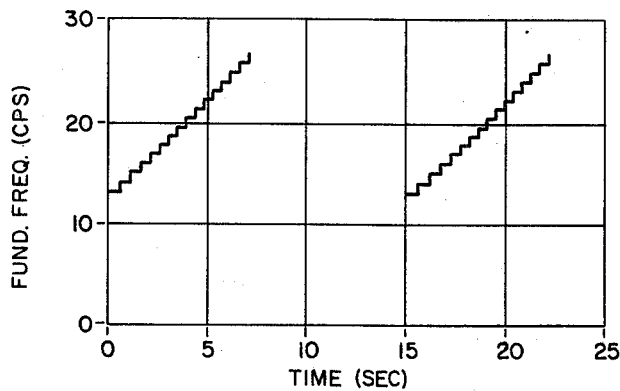
FIGURE 9 is a graphical representation of an acoustic signal having periodically varying fundamental frequencies according to the invention.

An example of the operation of an underwater acoustic source having chamber volumes in accordance with the invention is illustrated in FIGURES 8 and 9, by assuming the following operating conditions:

$P_0 = 21.3$ p.s.i.a. (depth = 15 feet),
Gas chamber pressure $P_c = 2000$ p.s.i.a.,
Frequency range of interest = $10 < f < 30$ c.p.s., and
Sweep interval (one cycle of operation) $T = 7.5$ seconds.

Substituting $P_0 = 21.3$ p.s.i.a. and $P_c = 2000$ p.s.i.a. in Equation 8 provides:

$$f_0 = 58.5/V_c^{1/3} \qquad (9)$$

This relation is plotted in FIGURE 8 with a range of assumed gas chamber volumes from 10 cubic inches to 100 cubic inches. From an inspection of FIGURE 8, it will be seen that the fundamental frequency of the signal generated by the present invention is inversely proportional to the cube root of the gas chamber volume of the device. Analysis of test results for different sizes of gas chamber volumes has illustrated that the energy density in the 5 cycles per second frequency band centered at the fundamental frequency is approximately 10 joules per cubic inch of chamber volume. This energy density is nearly insensitive to firing depth and chamber size in a normally used range of firing depths and chamber sizes.

FIGURE 9 illustrates the frequency spectrum generated by an acoustic signal generator of the invention during two sweep intervals of 7.5 seconds each. An interval of "dead time" is shown in FIGURE 9 between 7.5 seconds and 15 seconds in order to allow the generated signal to be picked up by the detectors trailed behind the seismic exploration vessel before the initiation of a newly generated signal. In the generation of such a signal by the apparatus shown in FIGURES 2 and 3, the piston 34 is reciprocated within the chamber 24 at a varied rate in order that the outlet ports 32 are open for varied periods of time. According to Equation 7, the volume of gas exhausted through the outlet ports 32 is thus varied.

With the use of the apparatus shown in FIGURES 4 and 5, frequency sweeps similar to those illustrated in FIGURE 9 may be generated by rotating the rotor 52. The volume of the chambers from which gas is exhausted through the port 64 is thus progressively changed, and, as shown by Equations 3 and 5, the volume of the exhausted gas is progressively changed.

What is claimed is:

1. A source of acoustic energy for seismic exploration comprising:
   (a) structure forming a chamber having inlet and outlet ports,
   (b) means for providing a supply of pressurized gas within said chamber,
   (c) means movable within said chamber for selectively varying the effective volume of the chamber and for opening said outlet port for selected emission of pressurized gas as bubbles from said outlet port when said source is immersed in a fluid medium, and
   (d) power means operable to vary the rate of movement of said movable means to vary the length of time said means opens said outlet port for control of the fundamental frequency of emission of the pressurized gas as bubbles into the ambient fluid medium.

2. The source of acoustic energy of claim 1 wherein said means movable within said chamber comprises a piston disposed for reciprocation by said power means within said chamber.

3. The source of acoustic energy of claim 2 wherein said piston contains gas passageways therethrough, said outlet port being so configured and disposed on a side of said chamber as to provide an outlet opening the instantaneous effective size of which is dependent upon the instantaneous position of said piston.

4. The acoustic source of claim 3 wherein said power means reciprocates said piston within said chamber, the rate of reciprocation controlling the fundamental frequency of the pressurized gas bubbles released through said outlet port.

5. The acoustic source of claim 1 wherein said means movable within said chamber comprises a plurality of radial vanes rotatable about an axis by said power means.

6. The acoustic source of claim 5 wherein the spacing between said radial vanes is varied.

7. The acoustic source of claim 5 wherein a supply of pressurized gas is introduced from the center of rotation of said radial vanes and passes between said radial vanes to said outlet port.

8. Apparatus for controlling the release of pressurized gas comprising:
 (a) a chamber having an inlet for receiving pressurized gas and an outlet for exhausting the pressurized gas,
 (b) a piston movable within said chamber to selectively control the passage of the pressurized gas through said outlet by selectively controlling the length of time said outlet is open for exhausting of the pressurized gas, and
 (c) power means for varying the rate of movement of said piston within said chamber between a plurality of control positions.

9. Apparatus for controlling the release of pressurized gas comprising:
 (a) a chamber having an inlet for receiving pressurized gas and an outlet for exhausting pressurized gas,
 (b) a plurality of radially spaced vanes rotatable within said chamber past said outlet for controlling the passage of the pressurized gas through said outlet, and
 (c) power means for moving said radially spaced vanes relative to said outlet between a plurality of control positions.

10. Apparatus of claim 9 wherein the spacing between said radially spaced vanes is varied.

11. The apparatus of claim 9 wherein said chamber is generally cylindrical and said radially spaced vanes rotate about the center axis of said chamber, the pressurized gas passing from the center of said vanes radially outwardly for exit through the sides of said chamber.

12. The method of transducing acoustic energy underwater comprising:
 (a) creating a supply of pressurized gas within an underwater chamber having an outlet port,
 (b) moving a member within the chamber to vary the effective volume of the chamber and to selectively open the outlet port to control emission of pressurized gas bubbles from the outlet port, and
 (c) selectively varying the rate of movement of the member within the chamber for control of the time interval the outlet port is open to the chamber to thereby control the frequency content of the gas bubbles.

13. The method of emitting acoustic energy of claim 12 and further comprising:
 reciprocating a piston within the chamber to open or obstruct the outlet port for time intervals dependent upon the rate of reciprocation of the piston.

14. The method of emitting acoustic energy of claim 12 and further comprising:
 rotating a vaned rotor within the chamber, the spaces between the rotor vanes defining the effective volume of the chamber.

References Cited

UNITED STATES PATENTS

| | | | |
|---|---|---|---|
| 3,072,094 | 1/1963 | Cole et al. | 116—147 |
| 3,379,272 | 4/1968 | Brooks | 181—.5 |
| 3,379,273 | 4/1968 | Chelminski | 181—.5 |

BENJAMIN A. BORCHELT, Primary Examiner

T. H. WEBB, Assistant Examiner

U.S. Cl. X.R.

340—8, 17